W. A. JOHNSON.
SHOCK ABSORBER.
APPLICATION FILED JUNE 8, 1910.

975,249.

Patented Nov. 8, 1910.

Witnesses:
H. R. L. White
R. A. White

Inventor:
William A. Johnson
By Foree Bain and May
Attys.

UNITED STATES PATENT OFFICE.

WILLIAM A. JOHNSON, OF CHICAGO, ILLINOIS.

SHOCK-ABSORBER.

975,249.

Specification of Letters Patent.

Patented Nov. 8, 1910.

Application filed June 8, 1910. Serial No. 565,789.

*To all whom it may concern:*

Be it known that I, WILLIAM A. JOHNSON, a citizen of the United States, residing at Chicago, in the county of Cook and State of Illinois, have invented certain new and useful Improvements in Shock-Absorbers, of which the following is a specification.

My invention relates to improvements in shock absorbers, and has for its general object to provide an improvement in pneumatic shock absorbers for automobiles or other vehicles whereby the device is adapted when in any position to offer an air-cushion resistance to sudden relative movement of the parts to which the opposing elements of the structure are connected, and whereby it is adapted to operate substantially without recoil.

In general, my invention provides a cheap, efficient, durable, device, by which a piston member (for attachment to one relatively movable part of the car), working in a cylinder (for attachment to the other relatively movable part of the car) serves when moved in either direction in the cylinder to compress the air toward that end of the cylinder until its movement is stopped and reversed, and then immediately to open a passage of communication between opposite sides of the piston to equalize the pressure and to prepare the piston to oppose its movement from the position just attained.

Figure 1:
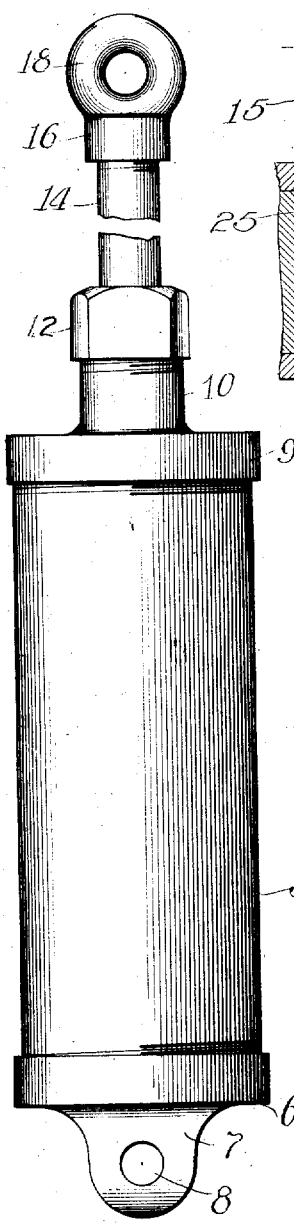
Figure 3:
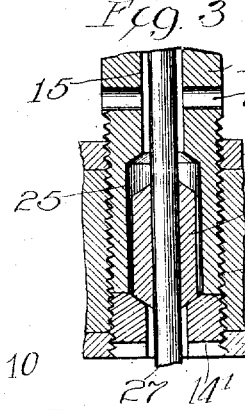
Figure 2:
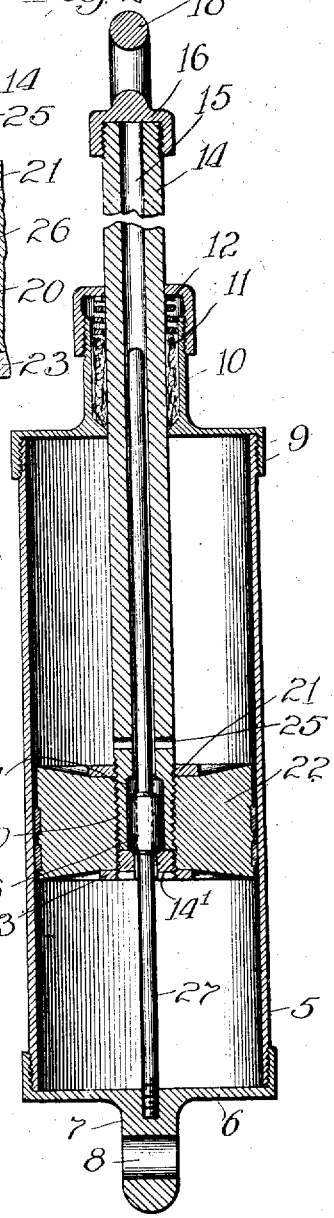

In the drawings, Figure 1 is a side elevation of a structure embodying my invention; Fig. 2 is a central vertical section; and Fig. 3 is an enlarged detail of a valve and its surrounding parts.

Referring to the drawings, 5 indicates a cylinder, closed at one end by a head, 6, provided with a lug, 7, having an aperture, 8, whereby it may conveniently be attached to the spring of an automobile, or to one of any two relatively moving parts. 9 indicates a head for the opposite end of the cylinder preferably providing a stuffing-box extension, 10, suitably packed, as at 11, for coöperation with the piston rod, to be described, and covered by the cap, 12.

14 indicates a hollow piston rod working through the stuffing box structure, the channel or duct, 15, through said rod being closed at its outer end, as, for example, by a screw-threaded fitting 16, carrying a ring, 18, whereby connection of the piston rod may be made to the car body or other relatively movable element.

Thus, it will be seen that the construction thus far described provides the cylinder 5 as a completely closed structure, the interior of which has no communication with the exterior air.

At its inner extremity, the hollow piston rod, 14, is screw-threaded, as at 20, to receive a lock nut, 21, and a piston 22, closely fitting the cylinder. The piston, 22, extends somewhat beyond the extremity of the valve rod proper, 14, and a short section, 14', of similar tubular stock to the piston rod is screwed into the piston and locked therein by a nut, 23. The faces of the piston are dished, so that the nuts, 21 and 23, lie between the edge-planes of the piston. Within the portion of the hollow piston rod encompassed by the piston, I provide a valve chamber, 24, formed by counterboring the end of the piston rod, 14, so that a shoulder or seat is provided surrounding the central channel, 15. The section, 14', of the valve rod is made separate from the balance thereof primarily to facilitate the construction of this enlarged valve chamber within the piston rod. Ports, 25, effect communication between the interior channel, 15, of the tubular piston rod 14, and the cylinder chamber on that side of the piston through which the rod 14 extends so that in the absence of any restriction by the valve, a passage for communication between the cylinder chambers on opposite sides of the piston is provided through the channel, 15, its valve chamber enlargement, 24, and the ports, 25. This passage for communication is controlled by a valve, 26, fitting very loosely within the chamber, 24, but having each end arranged to make close contact with and seat upon corresponding ends of the chamber 24. As best shown in Fig. 3, the valve member, 26, makes a close sliding connection throughout its entire length (which would be preferably considerably greater than its diameter) with a guide rod, 27, fixedly mounted in the head 6 of the cylinder, and extending loosely into the open channel 15 of the piston rod to a distance sufficient to maintain its engagement with the piston rod through any normal movement of the latter.

In operation, whenever the piston is moved in either direction with respect to the cylinder, the frictional engagement of the valve 26 with its guide rod 27 prevents said valve from moving until the movement of the piston has seated it against and caused it to close the opening, 15, at the rear end of the valve chamber with reference to the direction of piston movement. This seating of the valve closes the passage for communication between opposite sides of the piston and confines, on the side of the piston in the direction of advance thereof, a body of air which acts as a resilient cushion tending with constantly increasing force to check the advance of the piston. When the piston advance ceases, the compressed air naturally tends to cause a recoil of the piston to initial position, but the instant that the recoil or return movement of the piston commences to take place, the retardation of the valve 26, due to its frictional engagement with its guide rod, 27, permits the piston so to move relative to the valve 26 that the valve is unseated and the passage for communication between the two sides of the piston is opened so that pressure instantly equalizes. Then, if the return movement of the piston continues, due to continuing movement between the vehicle parts, the valve seats in the opposite direction, tending to check any movement of the piston from the last position which it had attained. Thus, it will be seen that, regardless of the position of the piston in the cylinder, the device is conditioned to offer resistance to relative movement between the vehicle parts in either direction, and that, when movement has taken place, the device resists return movement between the parts from the position thus attained, thereby effectively to prevent detrimental recoil, and so to save undue strains upon the vehicle springs.

While I have herein described in some detail a particular embodiment of my invention, it will be apparent that changes might be made in the mechanical embodiment thereof without departure from the spirit of the invention and within the scope of the appended claims.

What I claim is:

1. A shock absorber comprising a cylinder, a piston therein provided with a passage therethrough for fluid communication from one side to the other of the piston, a valve controlling said passage bodily movable in either direction with the portion of the passage which it controls, and also relatively movable in either direction to close said passage when at either extreme of said relative movement, and a stationary guide for said valve constantly engaged therewith frictionally to oppose its movement with the piston in either direction and thereby to occasion said relative movements of the valve to close the passage.

2. In a shock absorber, a cylinder, a piston therein providing an axial passage for communication between cylinder chambers on opposite sides of the piston, a valve within said passage bodily carried by the piston in both directions of the movement of the latter, and relatively movable in said passage to close the passage when in either extreme of said relative movement, and a guide rod with which said valve makes frictional engagement to oppose the movement of the valve with the piston in either direction and thereby to occasion its relative passage-closing movements; said guide rod being carried by the cylinder and said valve and rod being located on the axial line of the cylinder.

3. In a device of the character described, a cylinder, a piston therein, a piston rod extending through an end of the cylinder, said piston and piston rod structure providing an axial channel, enlarged within the piston to form a valve chamber, and providing openings for communication from said valve chamber to the cylinder chambers on both sides of the piston, a valve within and fitting loosely said axial chamber, adapted to close the opening for communication with either side of the piston, and an axial rod carried by the cylinder extending through the valve chamber and valve making frictional connection with the valve and extending into the axial bore of the piston rod, whatever the position of the piston.

In testimony whereof I hereunto set my hand in the presence of two witnesses.

WILLIAM A. JOHNSON.

In the presence of—
W. LINN ALLEN,
MARY F. ALLEN.